Sept. 16, 1969   M. R. NIELSEN   3,466,749
DENTAL CONSOLE
Filed Nov. 1, 1965   8 Sheets-Sheet 1
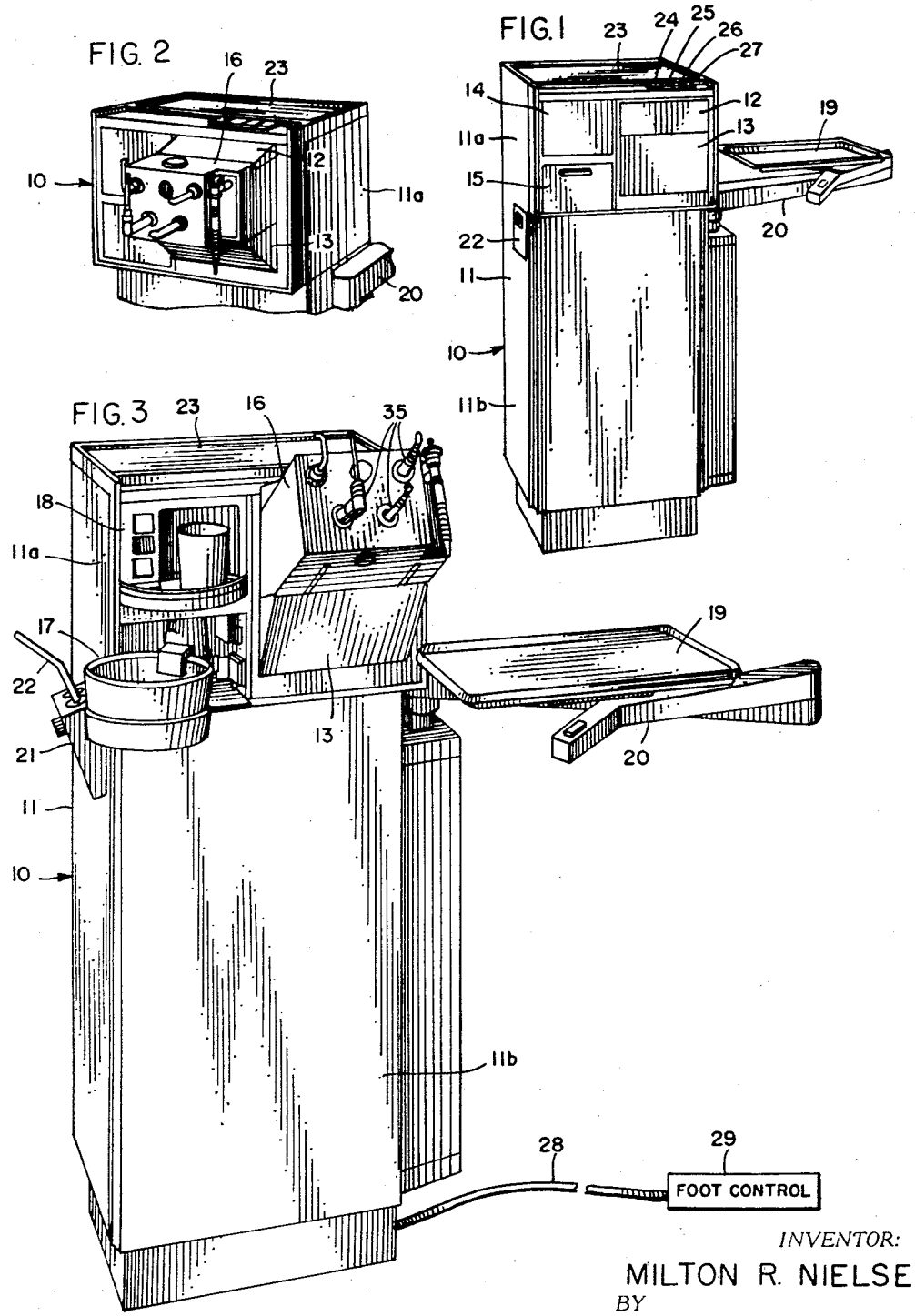
INVENTOR:
MILTON R. NIELSEN
BY
Dawson, Tilton, Fallon, Lungmus & Alexander
ATT'YS INVENTOR:
MILTON R. NIELSEN
BY
Dawson, Tilton, Fallon, Lungmus & Alexander
ATT'YS

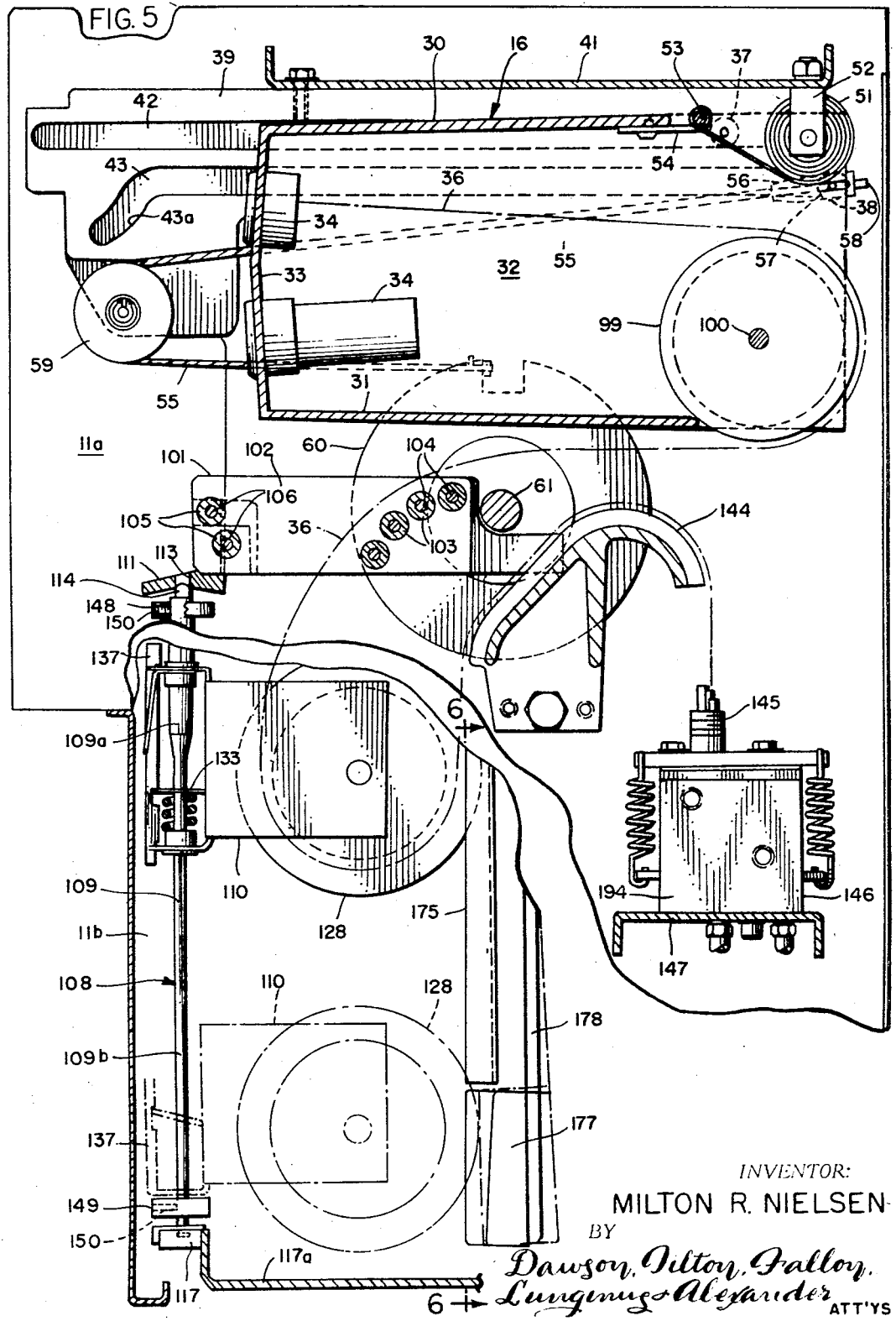

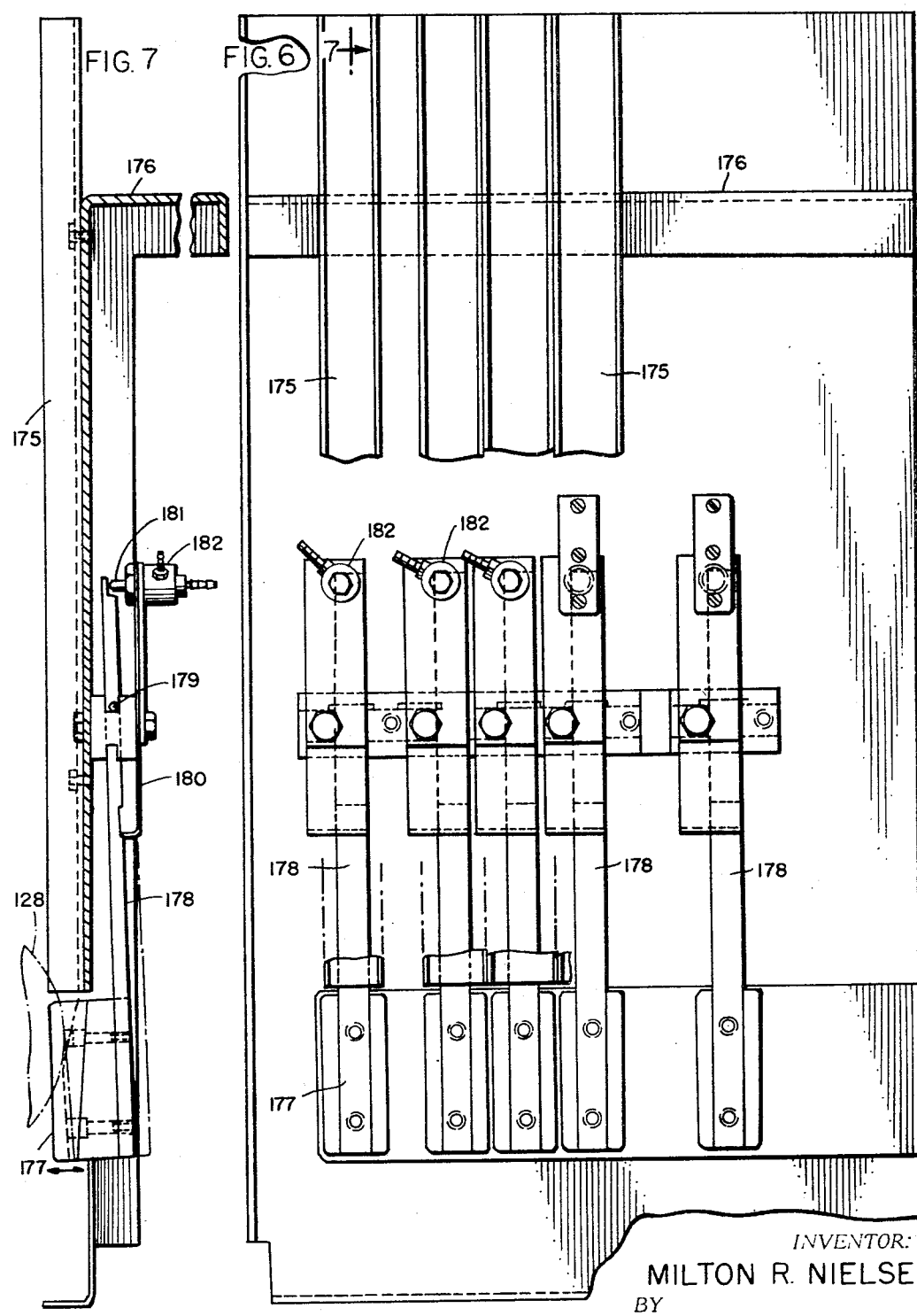

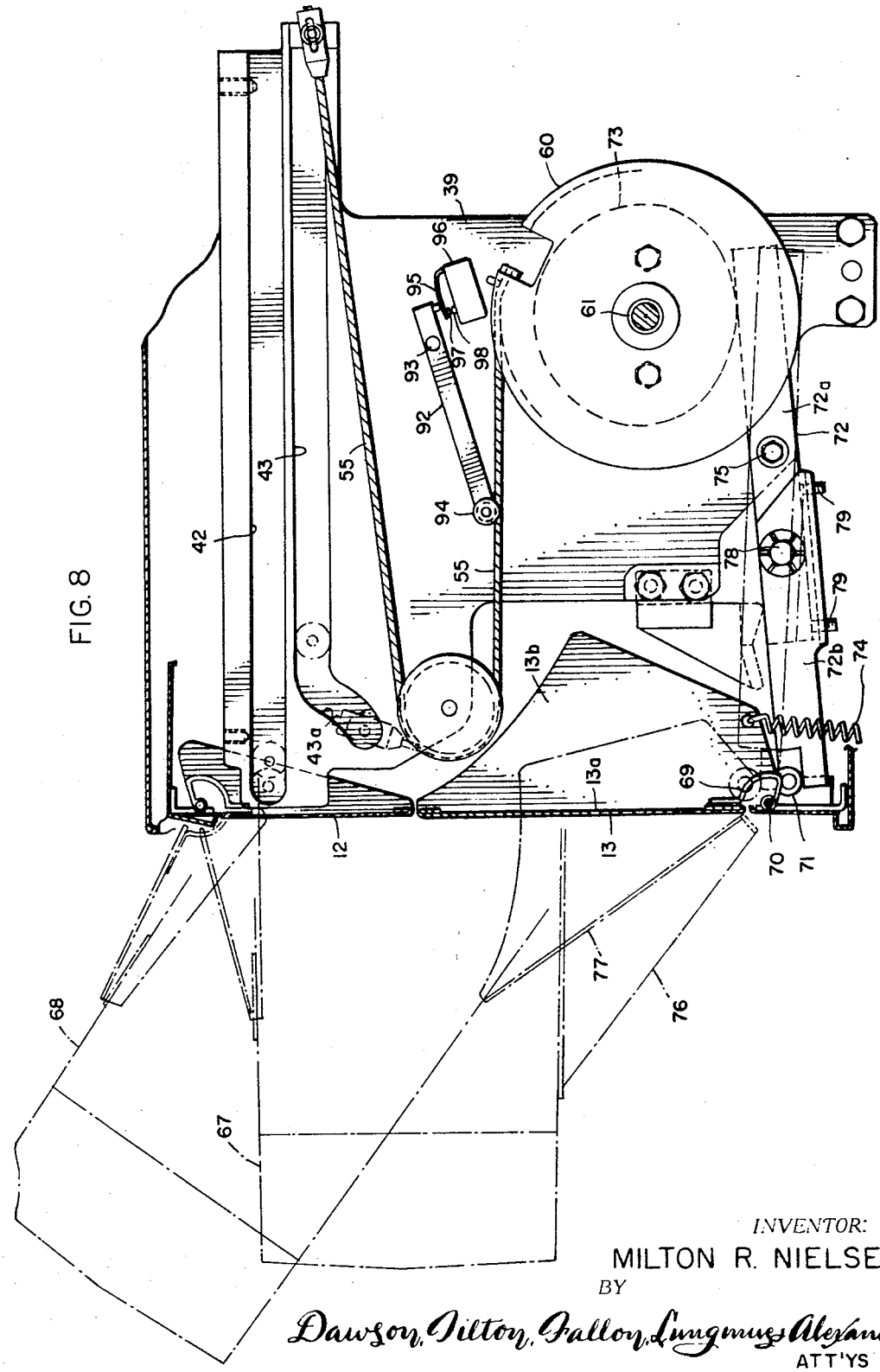

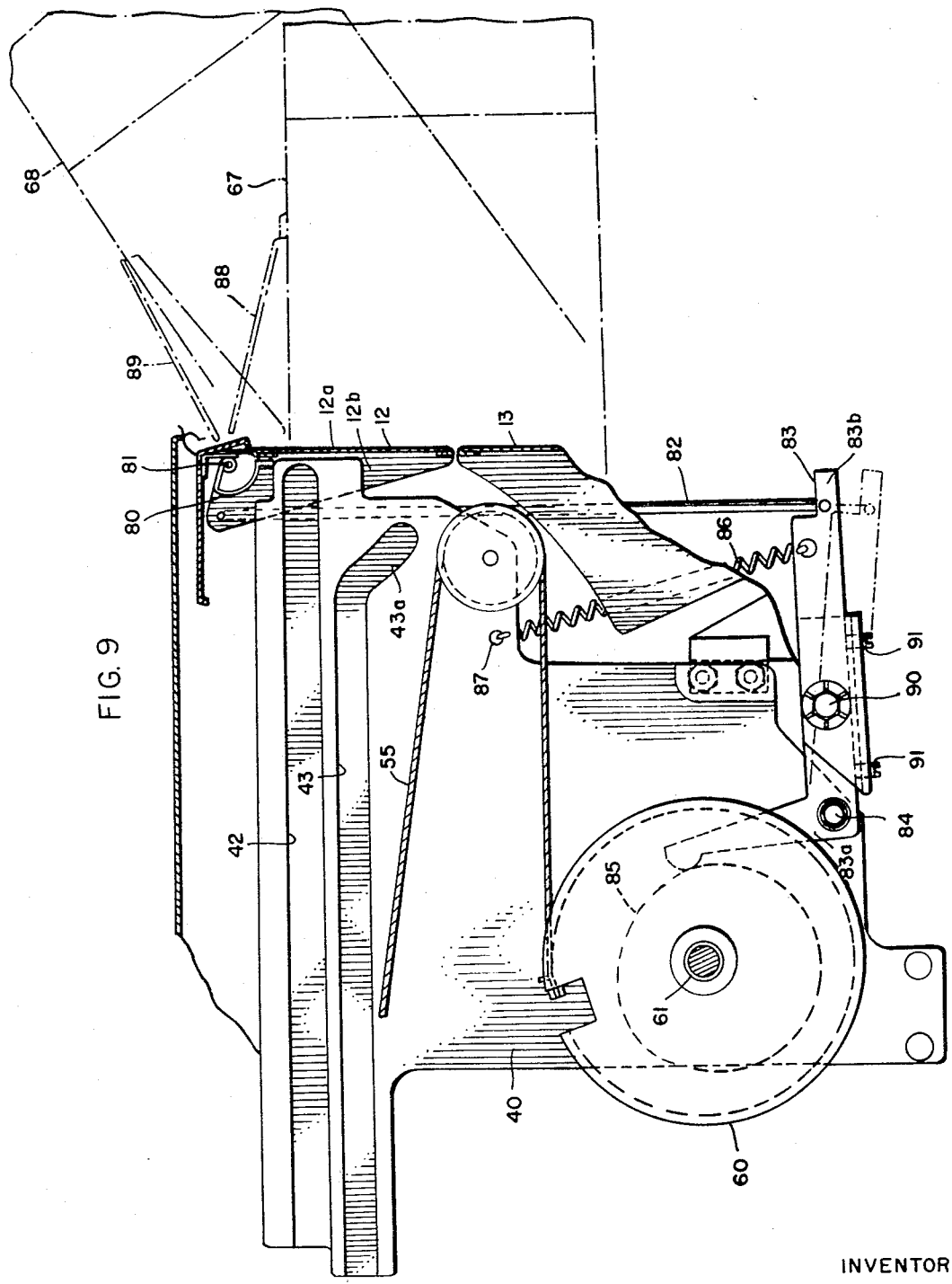

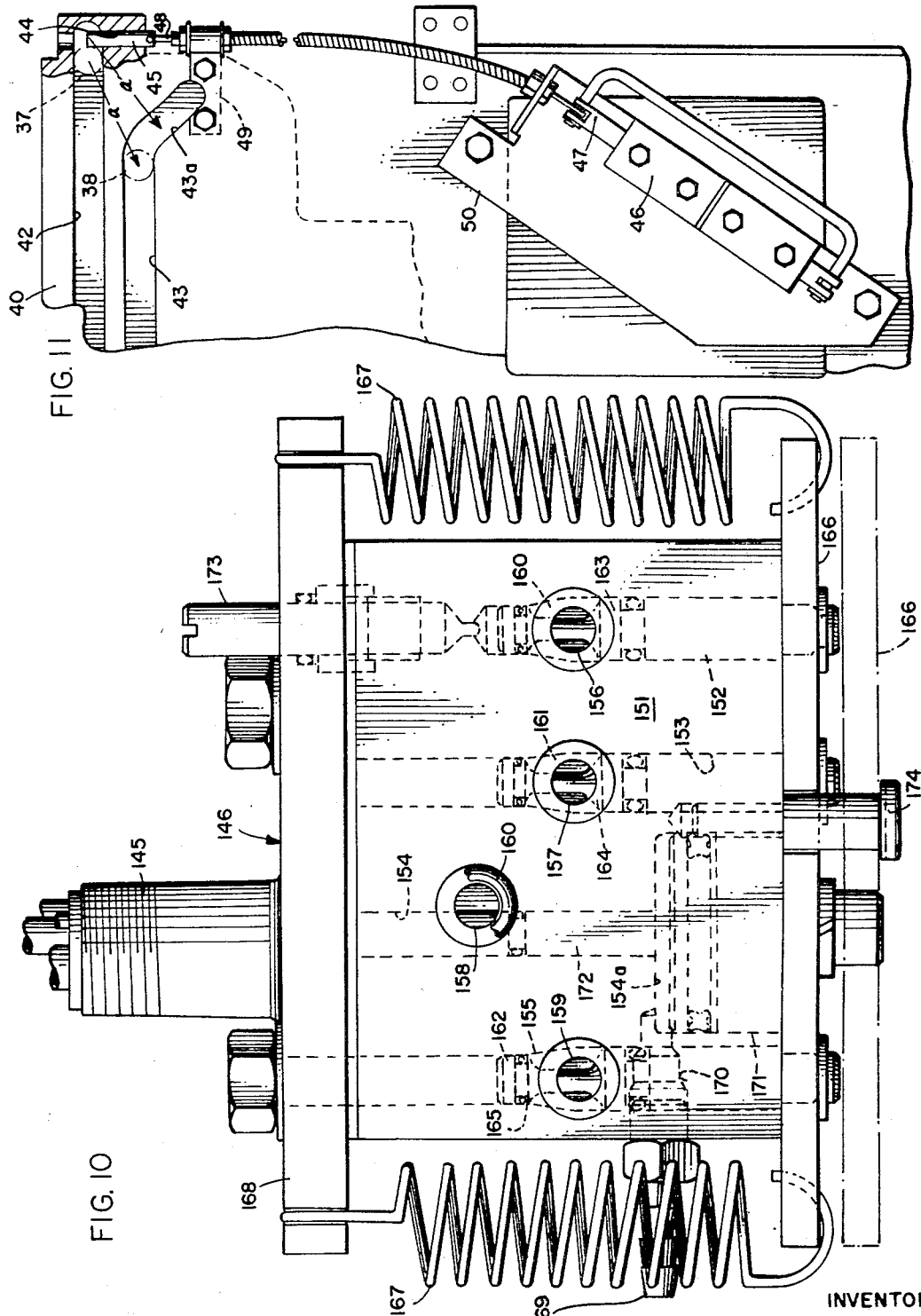

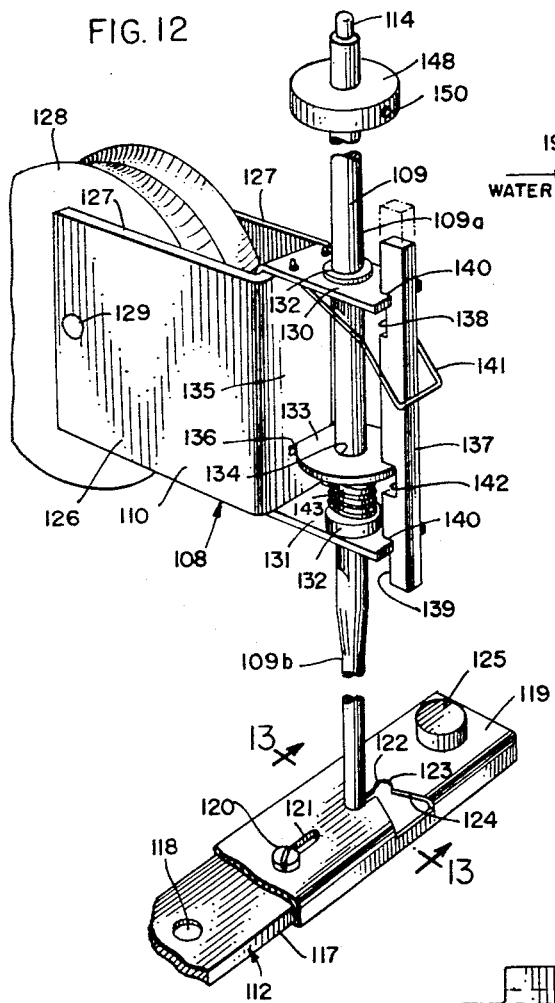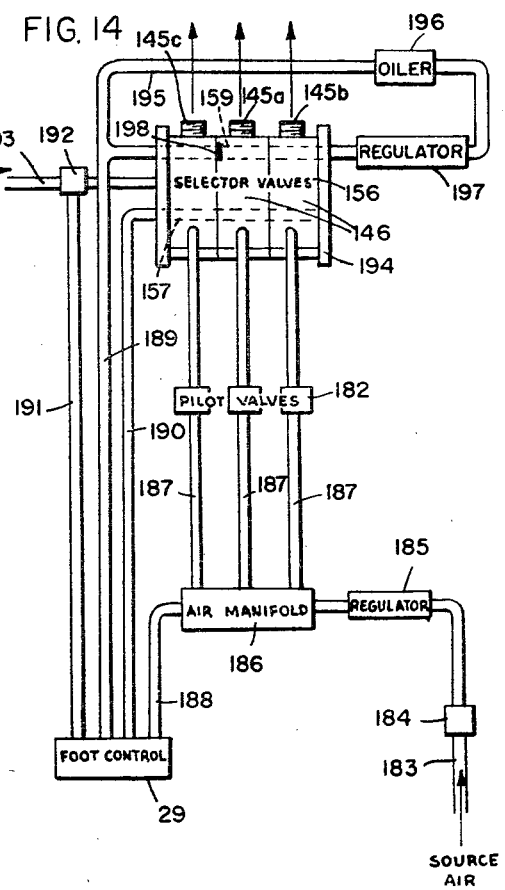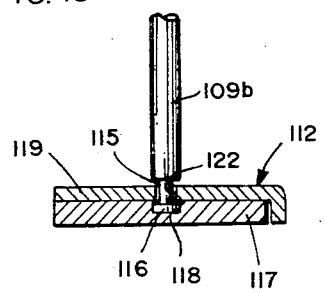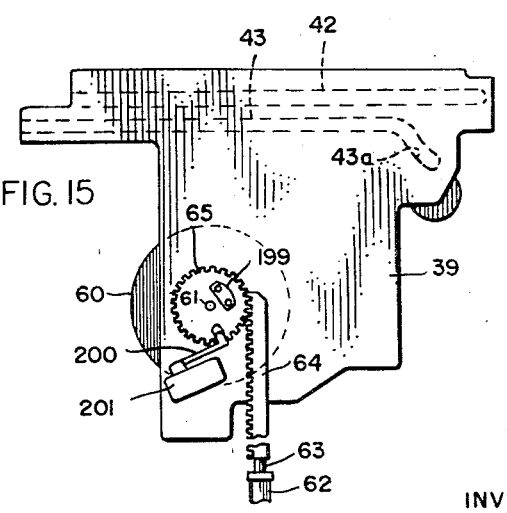

United States Patent Office 3,466,749
Patented Sept. 16, 1969

3,466,749
DENTAL CONSOLE
Milton R. Nielsen, Wheaton, Ill., assignor to American Hospital Supply Corporation, Evanston, Ill., a corporation of Illinois
Filed Nov. 1, 1965, Ser. No. 505,918
Int. Cl. A61c *19/02*
U.S. Cl. 32—23                                10 Claims

ABSTRACT OF THE DISCLOSURE

A dental console for supporting air-driven handpieces. The supply hoses for the handpieces are carried by trolley assemblies equipped with releasable latching means for preventing retraction into the unit of any selected length of hose until release is intentionally triggered. The trolley assemblies and guide rods upon which they slide are removably mounted in the console and a selector valve assembly having pilot valve levers engageable by the trolley assemblies controls the flow of fluid to the handpieces.

---

This invention relates to a dental console, and more specifically, to a dental unit which houses the handpieces, cuspidor, cup filler, and other devices commonly used by dentists.

Since the introduction of air-driven dental handpieces, there has developed a definite need for a dental console capable of supporting a plurality of such handpieces in an orderly manner which renders them readily available to a dentist while, at the same time, protects, and preferably conceals, such handpieces when they are not in use. While prior efforts have been made to develop such a console, such efforts, for a number of reasons, have been only partially successful at best.

For one thing, prior constructions have lacked the versatility needed to serve well the various needs and operating practices of different dentists. Some dentists, for example, prefer to work in a standing position with the patient's chair in a normal upright condition, whereas other dentists prefer to work in a seated position with the back of the dental chair sloping rearwardly. Dental handpieces which are readily accessible to the dentist in a standing position may be inconvenient for him to reach if he assumes a seated position, and vice versa. The failure to provide means for supporting dental handpieces in a way that would render them easily accessible to a dentist in either working position has been a major shortcoming of prior console constructions.

The lack of versatility of prior units is also evident in another respect. The choice of dental handpieces to be housed in such a unit is one which should be made by each dentist, based on his own personal preference. Prior units, however, have lacked the versatility necessary to satisfy such personal preferences; such units have in general been capable of accommodating only certain types or makes of dental handpieces, at least in the absence of making relatively expensive and difficult adjustments or changes in such units.

Compactness is a primary objective in the design of a dental console but, in the past, such compactness has not been achieved without also making some components of the console practically inaccessible and, in general, without making servicing and adjusting of such units time consuming and expensive. Problems of servicing prior units, along with the frequent need for such servicing arising, at least in part, from the mechanical complexities of such units, have been frequent sources of aggravation and complaint by dentists.

Accordingly, it is a principal object of the present invention to provide a compact dental console which overcomes the aforementioned defects and disadvantages of prior console constructions. Specifically, it is an object to provide a console which may be selectively operated to position a plurality of dental handpieces in a way that will render them easily accessible to a dentist whether he expects to work in a standing position or seated position. Another object is to provide a console which is easily and quickly adapted to support any of a wide variety of makes and styles of handpieces, and to support such handpieces in an order or arrangement tailored to suit the preference of the individual dentist.

Another object is to provide a console which, despite its compactness, supports its various components in a way that renders them readily accessible for servicing or adjustment. Hoses for the handpieces, which are subject to wear and which require periodic replacement, are readily accessible and may be easily and quickly removed and replaced. Similarly, other components of the console are easily accessible for maintaining the unit in peak operating condition.

A still further object is to provide a console with a retractable instrument-supporting head which may be shifted between its extended and retracted positions without danger that the hoses or lines for the various handpieces might become tangled, kinked, or damaged. It is also an object to provide a console in which the maximum length of hose to be withdrawn from the console for each of the various handpieces can be easily adjusted to suit the individual preferences of dtentists. In this connection, it is also a specific object to provide means which retract each hose when use of the handpiece associated therewith is no longer required, but which does not exert a retracting force on the hose when only a partial length thereof has been withdrawn from the unit. Unlike prior consoles, it is unnecessary for a dentist to pull out each hose to its fullest extent in order to render temporarily inoperative the hose-restracting mechanism. Thus, a dentist need not withdraw an excessive length of hose from the unit in order to eliminate the hose-retraction forces which would otherwise interfere with proper manipulation of the handpiece.

A still further object is to provide a dental console which is substantially foolproof in its operation and which, despite its multiple functional advantages over prior constructions, is relatively simple in its construction. Should a dentist inadvertently position an instrument so that it obstructs retraction of the head, the instrument-supporting head will either refuse to retract or, if partially retracted, will return automatically to its original extended position.

Other objects will appear from the specification and drawings in which:

FIGURE 1 is a perspective view of a dental console embodying the present invention, the console being illustrated in closed condition;

FIGURE 2 is a perspective view of the upper portion of the console showing the instrument-supporting head extended in a first position of adjustment;

FIGURE 3 is a slightly enlarged perspective view of the console illustrating the instrument-supporting head extended into a second position of adjustment, and also indicating the cuspidor, cup filler, and evacuator in operative positions;

FIGURE 5 is a still further enlarged and broken sectional view taken along line 5—5 of FIGURE 4;

FIGURE 6 is a broken vertical sectional view taken along line 6—6 of FIGURE 5;

FIGURE 7 is a sectional view along line 7—7 of FIGURE 6, FIGURES 6 and 7 showing primarily the arrangement of pilot valves and the operating mechanism therefor;

FIGURE 8 is an enlarged vertical sectional view taken along line 8—8 of FIGURE 4 and showing the means for extending the instrument head, for something now functioning of the extension-retraction mechanism, and for opening the lower door for the instrument head;

FIGURE 9 is a broken sectional view similar to FIGURE 8 but showing the mechanism viewed in the opposite direction as indicated by line 9—9 of FIGURE 4;

FIGURE 10 is an enlarged elevational view of a modular valve component for directing drive air, chip air, and water to a dental handpiece;

FIGURE 11 is an enlarged fragmentary sectional view taken along line 11—11 of FIGURE 4;

FIGURE 12 is a perspective view of a hose-supporting trolley and guide rod assembly used in the console of the present invention;

FIGURE 13 is an enlarged broken sectional view taken along line 13—13 of FIGURE 12;

FIGURE 14 is a diagrammatic view of the air and water circuits for the dental handpieces supported by the console;

FIGURE 15 is a side elevational view in reduced scale showing a head supporting plate, the head-driving mechanism, and a valve control switch, when viewed along line 15—15 of FIGURE 4.

General description

Figure 4:
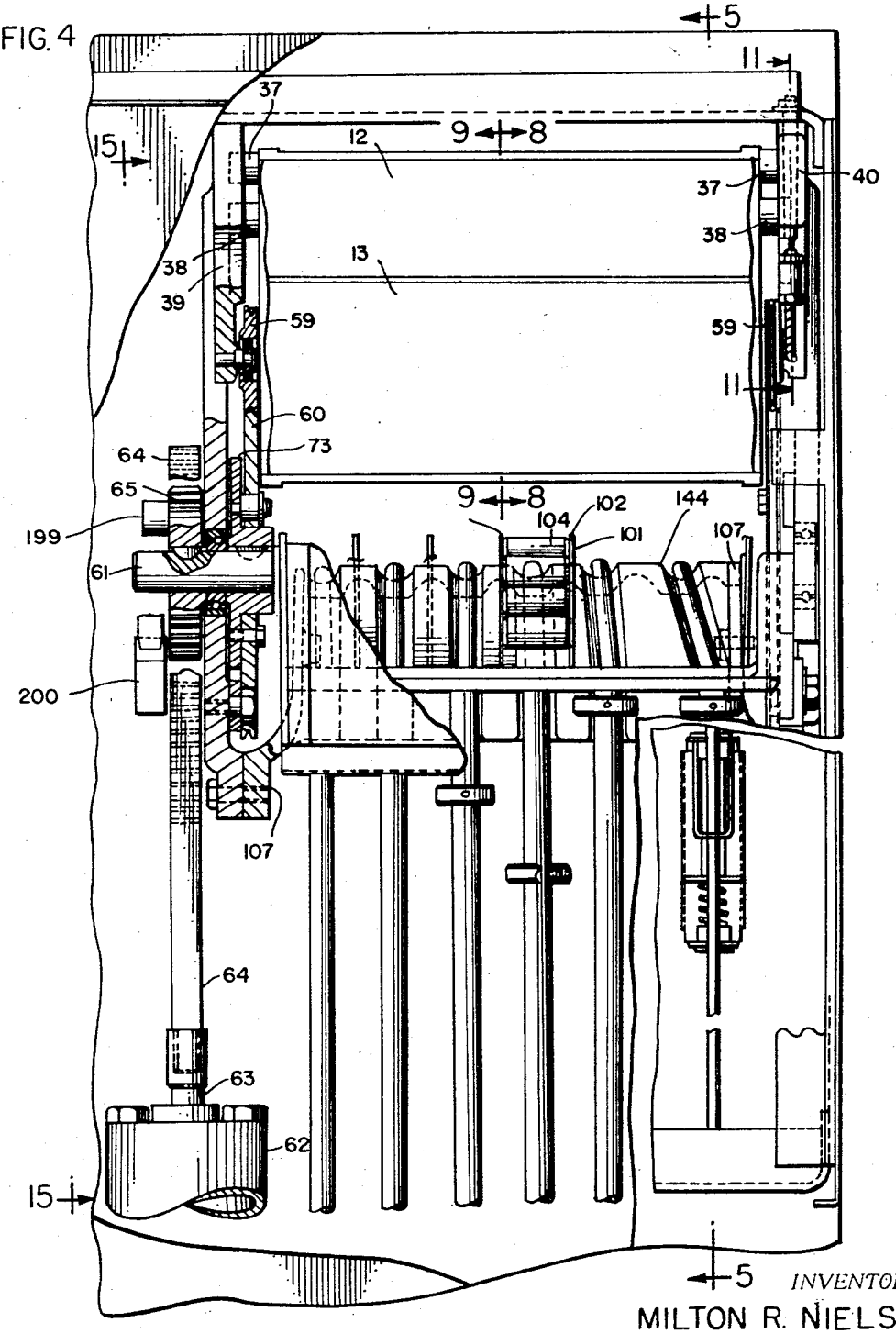
FIGURE 4 is an enlarged fragmentary front elevational view of the console illustrating in section a number of the internal components thereof.

A console embodying the present invention is designated generally in FIGURES 1–3 by the numeral 10. The console includes an outer casing 11 composed of top, front, rear, and side panels which together define an upper casing section 11a and a lower casing section 11b. The front panel of the upper section has three openings which are normally closed by doors or closure panels 12, 13, 14, and 15. As will be described in greater detail hereafter, doors 12 and 13 conceal instrument-supporting head 16 when that head is in its retracted condition. The two doors spread apart to expose the head when that head is extended forwardly into either a first position (FIGURE 2) or a second position (FIGURE 3).

Door 15 is swingable downwardly to expose an extensible cuspidor assembly 17, and closure panel 14 is part of a turntable which may be rotated when a side of panel 14 is pushed rearwardly to expose a cup-filling assembly 18 (FIGURE 3).

To the right side of the unit, when viewed from the front, is an instrument and supply tray 19 supported by an arm assembly 20. At the opposite side of the console is a hinged member 21 which is adapted to support an evacuator 22 intended for use by a dental assistant during oral surgery.

It will be observed that the console is provided with a flat top surface 23 which may be used in conjunction with tray 19 to support dental materials and equipment. Since surface 23 is at counter height, it is readily available for such use.

Along the front upper edge of the unit are four buttons 24–27, inclusive. Each button may be pressed in two directions, depending on whether the front or rear portions of the button are depressed. Button 24 is a "on-off" button for all of the electrical and hydraulic components of the console. Button 25 extends or retracts head 16 to or from the first extended position illustrated in FIGURE 2, and button 26 extends or retracts the head to or from the second extended position illustrated in FIGURE 3. Button 27 is an auxiliary button which may be used to control other accessories with which the console may be associated.

Extending from the base of the unit is a flexible conduit 28 leading to a foot control assembly 29 for controlling, by pedal operation, the operating speed of the dental handpieces carried by the head and the flow of water and chip air dischargeable from such handpieces. The structure and operation of such a foot controller is disclosed in co-owned U.S. Patent No. 3,054,187, and need not be set forth in detail herein.

Head retraction and extension assembly

As indicated in FIGURE 5, head 16 is in the form of a generally rectangular cast metal shell having top, bottom, side and front walls 30–33, respectively. The shell is hollow and is open at its rear end, with both the top and bottom walls terminating short of side walls 32. The front wall 33 is provided with a plurality of spaced openings in which tubes 34 are secured to provide receptacles or sockets for receiving dental handpieces 35 (FIGURE 3) and for guiding the hoses for such air-driven handpieces when the handpieces are withdrawn for use. In FIGURE 5, a hose for a dental handpiece is schematically illustrated by broken line 36.

The head 16 is supported entirely by two pairs of rollers, each pair projecting laterally in spaced relation from opposite sides of the head. As shown in FIGURES 4 and 5, each pair consists of an upper roller 37 and a lower roller 38. Lower rollers 38 are disposed in close proximity to the rear end of the head, whereas upper rollers 37 are spaced forwardly above the lower rollers.

The mounting means for the head comprises a pair of vertical support plates 39 and 40 disposed on opposite sides if the head and rigidly secured to the console casing by horizontal frame member 41 or by any other suitable means. The spaced mounting plates are disposed in the upper portion 11a of the casing directly behind doors 12 and 13.

Each mounting plate has on its inner surface a pair of horizontal channels 42 and 43, and the surfaces defining such channels serve as track means for receiving and guiding rollers 37 and 38. Upper channel 42 is horizontal throughout its entire extent, and stretches from the rear of each mounting plate to a point closely adjacent the front edge thereof (FIGURES 5, 8, 9, and 15). Lower channel 43, spaced below channel 42, also extends horizontally but, at its front end, is provided with a downwardly and forwardly curved extension 43a. Each extension is positioned and arranged with respect to the rollers of the head so that lower roller 38 does not fully reach the extension, and is therefore incapable of entering it, until upper roller 37 has reached the extreme forward end of channel 42.

The relationship will be clear from an examination of FIGURE 11, where it will be seen that the distance a between the axes of the upper and lower rollers 37 and 38 is substantially the same as the distance a between the rotational axis of the upper roller 37, when that roller is at the extreme front end of channel 42, and the bottom arcuate surface of channel extension 43a less the radius of lower roller 38. At least one of the mounting plates, in this instance, plate 40, is provided with a vertical passage 44 which intersects the front end of channel 42. A retractable stop member 45 is slidable within the passage between an extended position (FIGURE 11) in which it projects into the front end of channel 42 and prevents roller 37 from assuming an exteme forward position within that channel, and a retracted position in which forward movement of roller 37 into its extreme forward position is unobstructed. The stop member is shifted between its extended and retracted positions by means of a double-acting solenoid 46 which has its plunger 47 operatively connected to the stop member by a cable 48. The cable, stop member, and solenoid are held in position by brackets 49 and 50.

Referring to FIGURE 5, a constant-force roll spring 51 is supported by bracket 52 secured to stationary frame member 41. One end of the coiled roll spring, or "negater" spring, as it is commonly called, is secured to a transverse rod 53 which is carried by spaced hooks or brackets 54 along the upper rear edge of the instrument head's top wall 30. The spring 51 exerts a continuous and substantially uniform force on the head 16 tending to shift it rearwardly into the fully retracted position illustrated in FIGURE 5.

The head is pulled forwardly, in opposition to the force exerted by the spring, by means of a pair of cables 55. One end of each cable is provided with a ferrule which is held in place within an end fitting 56 which is pivotally secured to the outside of the head by means of a pivot shaft 57, such pivot shaft also serving as the axle for each rear roller 38 (FIGURE 5). An adjustment screw 58 is threadedly received within the rear portion of the fitting and bears against shaft 57.

The cable extends forwardly from the adjustment sleeve about an idler pulley 59 mounted along the front inner surface of each mouting plate 39 and 40. The cable then continues rearwardly where it is connected to the periphery of a large drive pulley 60. A pair of such drive pulleys is provided on each side of the head, one for each cable 55, and the two drive pulleys are secured to an axle 61 extending through both mounting plates 39 and 40 and journaled therein.

Axle 61 is rotated by a power cylinder 62 and piston 63, the latter being connected to a rack gear 64 which meshes with a pinion gear 65 secured to the end of axle 61 adjacent the outer surface of mounting plate 39 (FIGURES 15 and 4). The piston of the vertically-disposed cylinder 62 may be oil-driven, or air-driven, or both. An "oil over air" arrangement is preferred; the incompressibility of oil is an advantage in achieving smooth performance during movement of the head into extended position, and in maintaining the head in its extended position until retraction is desired.

When the drive pulleys 60 are rotated in a clock-wise direction (as viewed in FIGURE 5), the cables 55 on each side of the head are wound upon pulleys 60 and the head is pulled forwardly along channels 42 and 43. Looseness or play in the head is avoided not only because of the close tolerances of the parts, but because substantial opposing forces are at all times exerted upon the head. A forwardly-directed force is exerted by cables 55, and a rearwardly-directed force is exerted by constant tension spring 51. To insure proper centering of the front portion of the head between mouting plates 39 and 40, it is necessary only to adjust the screws 58 which are threadedly received in the end fittings connecting the rear ends of the cables to opposite sides of the head. Such adjustment screws are readily accessible from the back of the console casing.

The extent of retraction of the head is limited only by the extent of downward travel of piston 63. Even when the piston has reached its lower limit of travel, preventing further rearward movement of the head, roll spring 51 still exerts a substantially constant tension upon the head to maintain the head in a substantially rigid or fixed state of retraction.

As previously indicated, with reference to FIGURE 11, the extent of forward travel of the head is controlled by the length of channels 42 and 43. With stop member 45 in its upwardly extended position, forward travel ceases when roller 37 engages the stop. Since the vertical spacing between rollers 37 and 38 has remain unchanged, and since lower roller 38 is incapable of entering channel extension 43a, the head remains in horizontal position, as indicated in FIGURE 2 and as represented in FIGURES 8 and 9 by broken lines 67. With the head in its horizontal first position of extension, the instruments 35 carried by the head are within easy reach of a dentist performing work in a seated position. Since the piston 63, in its effort to move further upwardly, causes the head to exert a constant forwardly-directed force against stop member 45, the head is held firmly and securely in this selected position of adjustment.

While the dental handpieces would be easily accessible to a seated dentist while the head is in its first position of adjustment (FIGURE 2), they would be awkward to remove and replace by a dentist working in a standing position. Therefore, if a standing position is preferred by the dentist, extension of the head is controlled by button 26 which causes energization of solenoid 46 and retraction of stop member 45. The upper rollers 37 of the head may therefore advance to the ends of channels 42 and the pulling force exerted on cables 55 by the rising piston 63 drives the lower rollers 38 into channel extensions 43a until those rollers reach the lower limits of such extensions. During such downward and forward movement of lower rollers 38, upper rollers 37 serve as pivots, and the front portion of the head pivots upwardly into the second extended position illustrated in FIGURE 3 and indicated by broken lines 68 in FIGURES 8 and 9. Once again, the head is held securely in its extended position because, even though it has been stopped by the ends of the channels in which its rollers travel, the continued upward force exerted upon the piston maintain cables 55 in taut condition.

Door construction and operation

The construction and operation of the upper and lower doors 12 and 13 is best seen in FIGURES 8 and 9, and in FIGURES 1–3. The doors are positively controlled to insure a proper fit not only when the head is retracted, but also when the instrument head is extended into either its first (lowered) or second (raised) positions.

Referring to FIGURE 8, lower door 13 comprises a front panel 13a and a pair of integrally and rearwardly extending side wings 13b. The door is hinged to the console casing by means of a horizontally-extending hinge arm 69 along the door's lower edge, the hinge arm being carried by a horizontal hinge rod 70 secured to the casing.

Attached to the lower edge of one of the wing portions 13b (the wing disposed on the left when the console is viewed from the front) is a roller 71. The underside of the roller is engaged by the front upper surface of a rearwardly extending lever 72. The rear end of lever 72 bears upwardly against a cam 73 carrier by axle 61 and preferably secured to, or formed as part of, the drive pulley 60 adjacent mounting plate 39. Proper contact between the lever and the cam is insured by providing a spring 74 which has one end connected to a rear corner of a wing portion 13b and which has its opposite end secured to the console casing therebelow.

As shaft or axle 61 rotates to wind cables 55 and thereby shift the head into one of its extended positions, cam 73 also rotates to urge the rear end portion of lever 72 downwardly about its pivot 75. Upward movement of the lever's front portion drives roller 71 upwardly to swing door 13 outwardly into either of the positions 76 or 77 indicated in FIGURE 8. When the head is in its lowered extended position (represented by broken lines 67), the relative positions of cam 73 and lever 72 cause the door to assume the position represented by broken lines 76, whereas when the head is advanced to its raised extended position 68, the cam and lever return the door to the position indicated by broken lines 77.

To insure proper positioning of the door in relation to the positions of head 16, lever 72 is preferably composed of two sections 72a and 72b. The sections are joined by a bolt 78 which serves as a pivotal connection between the two. Section 72b is provided with a portion which extends beneath section 72a and through which adjustment screws 79 extend. Therefore, by rotating screws 79, the angular relationship between sections 72a and 72b may be varied to adjust the operation of door 13.

Like lower door 13, upper door 12 has a front panel 12a and integrally formed rearwardly extending side wing portions 12b (FIGURE 9). The upper door is provided with hinge arm 80 which is carried by a transverse hinge rod 81 mounted along the upper edge of the door opening. A connecting rod 82 extends vertically from the end of the wing nearest mounting plate 40 to the forward end of an L-shaped lever 83. The lever is carried by a pivot 84 affixed to mounting plate 40 and its upstanding portion rides against the peripheral surface of cam 85 carried by axle shaft 61 and secured to, or formed as part of, the drive pulley 60 adjacent mounting plate 40. A helical tension spring 86 stretches between the forward end of the lever and an aperture 87 in the mounting plate thereabove to hold the lever in contact with cam surface 85.

When the instrument head 16 is in its retracted condition, the free forward end of lever 83 is in its uppermost position and door 12 is closed. As axle shaft 61 and drive pulleys 60 rotate to extend the head, the forward end of the lever is pivoted downwardly because of contact between the lever's rear end portion and cam 85 and, as the lever pivots, door 12 is pulled into open position by connecting rod 82. When the instrument head reaches its lowered extended position indicated by broken lines 67, the cam-driven upper door assumes the position indicated by broken lines 88, and when the head is moved to its upwardly inclined position represented by broken lines 68, the additional rotation of cam 85 will have driven the upper door into the position indicated by broken lines 89.

Precise adjustment of the upper door and its operation is readily achieved by relative positioning of the two lever sections 83a and 83b. Like the two sections of lever 72, the sections of lever 83 are pivotally connected by a bolt 90 which passes through both sections. Section 83b has a portion which underlies section 83a and which is provided with adjustment screws 91 engaging the undersurface of section 83a. Rotation of the adjustment screws 91 shifts the two lever sections into the proper angular relationship necessary to achieve precise positioning of upper door 12 at the different stages of instrument head operation.

Safety control

As already indicated, the head 16 is shifted into its retracted position by the retracting force exerted by constant tension spring 51 (FIGURE 5). While the spring exerts a firm rearward pull on the head at all times, the force which it exerts in retracting the head is insufficient to cause damage to the parts in the event that head retraction is for some reason obstructed. For example, should a dentist improperly replace a handpiece in its receptacle, and should such handpiece thereafter engage the edge of the door opening as the head is retracted, retraction of the head will simply cease when the resistance to retraction exceeds the pulling force of spring 51.

In that event, cables 55 will slacken because drive pulleys continue to rotate even though the head has stopped. As shown in FIGURE 8, a cable tension sensing lever 92 is pivotally mounted upon plate 39 by pivot pin 93. Should the stretch of cable 55 slacken beneath the roller 94 of lever 92, the lever will pivot in a counterclockwise direction about pivot pin 93 and the spring arm 95 of switch 96 will be permitted to flex upwardly to separate contacts 97 and 98. Upon opening of the switch, a solenoid or other suitable control device (not shown) is actuated to reverse the flow through cylinder 62 and thereby reverse the direction of movement of piston 63. Retraction of the head is thereby interrupted, the cables 55 become taut, and the head is returned to an extended position. Upon re-extension of the head, the dentist may remove the obstruction which has prevented complete head retraction.

Hose retracting and extending assembly

Each handpiece 35 carried by the head is operatively connected to a length of hose through which drive air, water, and chip air are supplied. In use, such a handpiece is withdrawn from its receptacle and moved to the point where the dental work is undertaken. A substantial length of hose must feed out through the opening of the receptacle to permit such use of the handpiece. At all other times, the hose must be stored within the console without becoming kinked, tangled, or damaged.

Referring to FIGURE 5, the condition of a hose with the instrument head in retracted condition is schematically represented by broken line 36. Starting from receptacle 34, the hose extends rearwardly through the head or instrument holder to a guide pulley 99 freely rotatable upon a transverse shaft 100 extending between side walls 32. A separate pulley 99 is provided for the hose 36 for each handpiece, and since the hose-supporting assembly for each handpiece is identical, only a single assembly will be described herein.

Hose 36 extends rearwardly and downwardly about the rear surface of pulley 99 and then extends forwardly beneath the head to a roller assembly 101. The roller assembly for each hose comprises a pair of spaced vertical guide plates 102 between which a series of rear rollers 103, each carried by a horizontal shaft 104, and a series of front rollers 105, each carried by a horizontal shaft 106, extend. For clarity of illustration, only a single roller assembly 101 is illustrated in FIGURE 4; however, it is to be understood that substantially identical assemblies, joined together in horizontal alignment, are provided to guide all of the hoses for the handpieces carried by the head. The multiple roller assemblies are supported as a group by support arms 107 secured to mounting plates 39 and 40 (FIGURE 4).

As viewed in FIGURE 5, it will be seen that each roller assembly is disposed within the upper section 11a of the casing adjacent the front end thereof. The two series of rollers 103 and 105 define a downwardly narrowing passageway for guiding movement of hose 36 into or from the front portion of the casing's lower section 11b.

When the head is in fully retracted condition (FIGURE 5) hose 36 extends over the series of rear rollers 103. It is evident that when the head is shifted forwardly into an extended position, rear pulley 99 of the head will be above, and slightly ahead of, the front series of rollers 105, at which time movement of the hose will be guided primarily by the front rollers of assembly 101.

Directly below each roller assembly 101 is a trolley assembly 108. Such a trolley assembly is most clearly illustrated in FIGURE 12, and comprises a vertical guide rod 109 and a trolley 110 movable upwardly and downwardly along the rod. A separate trolley assembly is provided for each handpiece hose, and the vertical rods 109 for the multiple trolleys are supported at their upper and lower ends by upper mounting bar 111 (FIGGURE 5) and lower latching bar assembly 112, respectively.

Upper mounting bar 111 extends horizontally and transversely between the mounting plates 39 and 40 to which it is rigidly secured. A series of spaced vertical openings 113 is provided in the bar, each opening being adapted to slidably receive the reduced head portion 114 of a trolley guide rod 109.

Except for reduced head 114, the upper portion 109a of each guide rod is of uniform diameter throughout its entire extent. Upper portion 109a constitutes the major portion of the length of the entire rod. At its lower end, the cylindrical upper portion 109a merges smoothly with a lower portion 109b of substantially smaller diameter. Lower portion 109b continues downwardly for a substantial distance and, adjacent its lower end is provided with an annular groove or constriction 115 (FIGURE 13). The groove is spaced slightly above the extreme lower end of the rod to define an integral disk-shaped foot 116 at the rod's extreme lower end.

Latch bar assembly 112 comprises a transversely elongated bar 117 secured to a frame member 117a at the lower end of console casing 11 (FIGURE 5). The upper surface of bar 117 is provided with longitudinally spaced recesses 118, each of a diameter large enough to receive the cylindrical foot 116 of a guide rod 109. A latch plate 119 is longitudinally slidable upon bar 117 and is limited in its sliding movement by screws 120 which extend downwardly through longitudinal slots 121 in the plate and which are threadedly secured at their lower ends to bar 117. As shown in FIGURES 12 and 13, latch plate 119 is provided with longitudinal slots 112, each of a width slightly greater than the diameter of the stem portion defined by the groove 115 at the lower end of each guide rod 109, but smaller than the diameter of foot 116. Each slot 122 merges with an enlarged opening 123 of a diameter greater than foot 116. When the plate is in its latching position, as shown in FIGURES 12 and 13, foot 116 is locked within recess 118 by the latching plate portions thereabove which define longitudinal slot 122. Since the slot is narrower than the disk-shaped foot, the rod cannot be lifted and removed from the latching assembly. However, when the latching plate is shifted longitudinally so that the enlarged opening 123 is in vertical alignment with recess 118, the guide rod 109 may be lifted to withdraw the foot from recess 118.

Preferably, the longitudinal dimensions of upper and lower rod portions 109a and 109b are such that the lower end of the rod cannot be lifted vertically above the top surface of latch bar 119 as long as head 114 is received within opening 113, the extent of such upward movement being limited by engagement between the undersurface of bar 111 and the upper end of upper guide rod portion 109a at the lower end of head 114. It will be noted, however, that latch plate 119 is cut away to provide an enlarged front entrance to opening 123. Therefore, when the latch plate is disposed in its unlatching position, guide rod 109 may be lifted until foot 116 is clear of opening 118, and the foot may then be shifted forwardly through cut-out 124 until the lower end of the rod is free of the latch bar assembly. Complete removal of the trolley assembly 108 is then achieved by simply moving the guide rod 109 downwardly to withdraw head 114 from opening 113.

To facilitate movement of the latch plate between latching and unlatching positions, an upwardly projecting knob 125 may be mounted upon the plate (FIGURE 12).

Trolley 110 comprises a frame 126 having a pair of rearwardly extending arms 127 which support a vertical pulley 128 on a shaft extending between the arms. The frame also includes forwardly-projecting upper and lower arms 130 and 131 having vertically aligned apertures for slidably receiving guide rod 109. If desired, annular bearing members 132 formed of nylon or other suitable material may be fitted within the apertures of arms 130 and 131 to reduce frictional resistance between the guide rod and trolley.

Arms 130 and 131 are spaced apart vertically, and between the arms is a generally horizontal locking ring or member 133 having a central aperture 134 slightly larger than the diameter of guide rod 109. The intermediate wall portion 135 of the frame which extends between the upper and lower arms is apertured at 136 to receive an edge portion of ring 133 and to retain the ring in position between the arms without preventing pivotal movement of that ring. Ring 134 is therefore capable of pivotal movement about its points of contact with the edges of opening 136 and within the range permitted by the dimensional difference between the diameter of aperture 134 and the diameter of guide rod 109.

A vertically-elongated control member or bar 137 is disposed in front of arms 130 and 131 and has vertical dimensions substantially greater than the distance between such arms. In the illustration given, the control member is provided with upper and lower notches 138 and 139, and the upper and lower notch portions of the bar are received within front notches 140 in each of the forwardly-extending arms. A U-shaped spring 141 has its intermediate portion extending about the front of the bar and has its ends secured to upper arm 130. The spring maintains the control bar in operative position, urging it rearwardly against the notched arms. The extent of vertical movement of the bar with respect to the trolley frame is determined by the length of notches 138 and 139.

A third notch 142 is provided intermediate the upper and lower ends of the control bar for receiving the front peripheral portion of locking ring 133.

A helical compression spring 143 extends about guide rod 109 between the lower arm 131 of the frame and the undersurface of locking ring 133, and exerts an upward force tending to pivot the ring into an upwardly and forwardly inclined position about the ring's pivotal connection with the frame. In the absence of any opposition to such pivotal movement imposed by control bar 137, spring 143 will pivot the ring upwardly until the edges defining aperture 134 frictionally engage the surface of guide rod portion 109a. Under such conditions, the trolley 110 will be locked against downward movement along rod portion 109a, since the weight of the trolley will cause the front and rear edges of ring aperture 134 to tightly engage the surface of the upper rod portion, and any additional downward force exerted upon the trolley will only increase the gripping forces. However, upward movement of the trolley will not be similarly restrained because if the trolley is urged upwardly, ring 133 will automatically tend to pivot into a more nearly horizontal position, thereby relieving the frictional resistance between the ring and the guide rod.

When the control bar 137 is in a raised position, as indicated by broken lines in FIGURE 12, locking ring 133 is free to pivot upwardly under the influence of spring 143 to produce the one-way locking action described above. It is important to note, however, that such locking action can occur only between the ring 133 and the upper portion 109a of the guide rod. Should the trolley be disposed along the lower portion 109b of the guide rod, the upper edge of notch 142 of the control bar will prevent ring from pivoting sufficiently to engage and lock against the surface of lower rod portion 109b, even though the control bar is in its raised position.

Therefore, when the control bar 137 is raised, the trolley will be locked against downward movement if it is positioned along upper guide rod section 109a, but not if it is positioned along lower guide rod portion 109b. In either case, the trolley will be free to move upwardly, since the locking ring is effective only against movement of the trolley in a downward direction.

When the control bar 137 is in its lowered position illustrated in solid lines in FIGURE 12, the upper edge of intermediate notch 142 bears against the top surface of locking ring 133 and maintains the ring in a position substantially normal to the axis of guide rod 109. The frictional resistance betwen the control bar and the forwardly extending arms of the trolley is greater than the upward force exerted on the locking ring by spring 143. Therefore, when the control bar is in its lowered position, the trolley is free to move in either direction along guide rod 119.

Now referring again to FIGURE 5, it will be observed that hose 136 passes downwardly between the front and rear bearings of assembly 101 and extends downwardly, rearwardly, and then upwardly about the pulley 128 of trolley 126. The hose continues upwardly behind the pulley, over the channeled surface of a hose-support casting 144, and thence to the upwardly extending stem 145 of a selector valve 146. The selector valve is rigidly mounted within the console casing upon a transverse frame member 147. The end of the hose is threadedly secured to stem 145 and communicates with the various passages in the valve stem.

The relationship between head 16 and trolley assemblies 108 is such that when the head is in either of its extended positions, the guide pulleys 99 in the lower rear portion of the head are above, and slightly in front of, the trolleys. Therefore, when the head is extended, with the handpieces in place in their receptacles, the trolleys 110 are at their lowest points of travel along guide rods 109, as indicated in broken lines in FIGURE 5. Should a dentist remove one of the handpieces from its receptacle, the trolley which retains the hose for that particular handpiece will travel upwardly along the guide rod, the distance of travel depending on the length of hose withdrawn from the head. Once a minimum length of hose has been withdrawn from the head, the trolley will reach the upper enlarged portion 109a of the guide rod, and the hose will hold in place; that is, the trolley will automatically lock against downward movement and, therefore, no retraction force will be exerted upon the hose. The hose will hold in any position of the trolley when the locking plate 133 of that trolley is above the reduced lower section 109b of the guide rod assuming, of course, that control bar 137 is in its raised position. Since the reduced lower portion 109b is only a relatively small portion of the total length of each guide rod 109, a hose will hold in any position to which it is pulled after the first few inches of hose have been withdrawn from the instrument receptacle of the head.

At the upper and lower ends of each guide rod 109 are adjustable stop members 148 and 149. Such stop members are in the form of apertured disks which are slidably mounted along the upper and lower ends of the rod and which may be secured in any desired axial position by simply tightening radially-extending locking screws 150 against the rod's outer surface.

To release an extended hose after use of a handpiece is no longer needed, the dentist simply withdraws additional hose until the trolley 110 reaches the upper limit of its travel, as determined by the position of upper stop member 148. The stop member 148 is engaged by the upper end of slidable control bar 137. Such engagement performs two functions: it limits further upward movement of the trolley, and it urges the control bar into its lowered position so that locking ring 133 will be inoperative to prevent downward movement of the trolley and retraction of the hose. When the handpiece has been returned to its receptacle in the instrument head or holder, the trolley will again reach its lower limit of travel. The lower end of the control bar 137 will strike lower adjustable stop 149, the stop serving the double function of preventing further downward movement and also of shifting the slidable control bar into its raised position to render the locking ring again operative to hold the trolley in position should the hose be again withdrawn from the head.

When all of the handpieces are returned to their receptacles in the extended head, the locking rings of the trolley mechanisms will all be automatically cocked. Thereafter, when the head is shifted into the retracted position illustrated in FIGURE 5, the trolleys will be pulled upwardly a short distance because guide pulleys 99 of the head are disposed well behind the trolley assemblies when the head is fully retracted. However, the distance which the trolleys must travel upwardly to play out enough hose to permit full retraction of the head is less than the length of reduced lower guide rod portion 109b. Therefore, even though the locking rings are cocked, retraction of the head does not lift the trolleys to the point where their locking rings might engage upper guide rod portions 109a, as indicated in FIGURE 5.

The importance of rendering the cocked locking rings inoperative during retraction of the head is evident upon consideration of the difficulties which might occur if a different condition existed. If the guide rods 109 did not have reduced lower portions, then the cocked locking rings would be operative to restrain subsequent downward movement of the trolleys after the head 16 reaches its fully retracted position. Thereafter, should a dentist shift the head into either of its extended positions, the trolleys, held against downward movement, would create considerable slack in the hoses. Under such conditions, the hoses might leave their pulleys and could conceivably become tangled, kinked, or damaged.

Since upper stop 148 is adjustable, the length of hose which a dentist must withdraw from the head to uncock the locking ring of a trolley is readily adjustable to suit his individual preference. For example, if the maximum length of hose which can be withdrawn from the head is four feet with stop 148 in its highest position, the dentist may, if he has no need for operative hose lengths in excess of 30 inches, reset stop 148 downwardly so that the locking ring will be uncocked when 36 inches of hose are withdrawn from the head. Thus, with an additional pull of six inches beyond the maximum length of hose which he would expect to use in his dental work, the dentist will be able to uncock the locking ring to permit full retraction of the hose.

The adjustability of lower stop 149 permits slack to be removed from the hoses (which tend to stretch slightly over extended periods of use) when the trolleys are in their lowermost positions.

Valves and valve control

Each handpiece carried by the instrument head 16 is in circuit with its own selector valve 146 which controls the flow of drive air, chip air, water, and exhaust air for that particular handpiece. The construction of a selector valve is indicated in the enlarged view of FIGURE 10, and the relationship of that valve in the system as a whole is illustrated diagrammatically in FIGURE 14.

The selector valve comprises a block of metal 151 which is bored to provide two sets of four passages intersecting at substantially right angles. A first set of passages 152, 153, 154, and 155 extend in spaced parallel relation and are respectively intersected by passages 156, 157, 158, and 159. The second group of passages extend completely through the width of the block and the block is counterbored on opposite sides to provide annular recesses for receiving resilient sealing rings, such as indicated by ring 160. Thus, a plurality of identical blocks may be arranged in side-by-side relation with their passages 156–159 in respective alignment. FIGURE 14 illustrates the assembly of three of such valves with their transverse flow passages in direct communication.

In the form illustrated in FIGURE 10, passage 156 is for water, 157 is for chip air, 158 is for exhaust air, and 159 is for drive air.

Each of the intersecting passages 152, 153, and 155 has a tapered intermediate portion 160, 161, and 162. Spool-shaped valve members 163, 164, and 165 are longitudinally slidable within passages 152, 153, and 155, and are provided with sealing rings at their ends which are sealingly engageable with the inner surfaces of such passages. The ends of the three valves are connected to a plate 166 which is normally held in contact with block 151 by springs 167. When the plate is held against the block, all three valves are in closed condition, with the sealing rings at both ends thereof engaging the inner surfaces of the valve passages and preventing flow of water, drive air, and chip air from passages 156, 157, and 159 through passages 152, 153, and 155. However, when the valve operating plate 166 is in the outwardly-displaced position indicated by broken lines in FIGURE 10, all three valves will be open and water, chip air, and drive air will be able to flow from passages 156, 157, and 159 through the portions of passages 152, 153, and 155 leading to end plate 168. The end plate is channeled along the surface thereof facing block 151 so that each of the fluids passing from the respective passages will be directed to a separate conduit extending through stem 145 and through the hose leading to a dental handpiece.

Simultaneous opening of the valves occurs when air under pressure is directed through fitting 169 into passage 170 leading to chamber 154a. A piston 171 within chamber 154a is movable axially in response to air pressure to urge valve control plate 166 into its valve-opening position. It will be noted that piston 171 has one end thereof in engagement with 166 and has, at its other end, a reduced shank portion 172 which serves as a valve member for the control of exhaust air through passages 158 and 154. Like the other flow passages 152, 153, and 155, passage 154 communicates with a dental handpiece through a separate conduit in stem 145 and hose 36.

A needle valve 173 is provided to control the flow of water through the valve passage 152. Since such a needle valve construction is entirely conventional, a detailed description of its structure and operation is believed unnecessary herein.

The extent of movement of valve control member 166 is limited in one direction by stop member 174, the shank of the stop member passing through control plate 156 and serving to guide movement of that plate between valve-opening and valve-closing positions.

It will be noted that even when plate 166 is in its valve-closing position, the flow of fluids between adjacent valve blocks, through passages 156, 157, and 159, is permitted. Also, to a somewhat lesser extent, the flow of exhaust air through the aligned passages 158 of adjacent blocks is permitted.

Operation of the dental handpieces is controlled by a dentist through manipulation of foot control 29. To prevent operation of more than one handpiece at any given time, means are provided within the console for actuating only the one selector valve 146 which is in communication with the particular dental handpiece withdrawn from its socket in the instrument head.

Referring to FIGURES 5, 6, and 7, the rear portion of each trolley pulley 128 is guided by a vertical channel 175 secured to frame member 176 of the console. The forwardly extending sides of the channels prevent lateral movement of the rear portions of the pulley and, in addition, direct the pulleys into contact with the contact members 177 of lever arms 178 when the pulleys approach fully lowered positions. Since the contact members normally project forwardly from channels 175, they are engaged by the pulleys, or by the hoses carried thereby, to swing the upstanding lever arms 173 in counterclockwise directions (FIGURE 7) about pivot pins 179. When, on the other hand, the pulleys are raised positions within channels 175, the lever arms are urged by springs 180 in a clockwise direction, causing the arms to engage the operating stems 181 of pilot valves 182 and thereby open such valves.

Each pilot valve is in direct communication with the fitting 169 of a selector valve 146. Therefore, when all of the trolleys 110 are in their fully lowered positions, all of the pilot valves 182 are closed, as are all of the selector valves 146.

As previously explained, all of the trolleys assume their extreme lowered positions only when the instrument head is in its extended positions. Should a dentist withdraw a dental handpiece from its socket, the trolley for that handpiece will be raised, and only the pilot valve and selector valve for that handpiece will be activated. When the dentist then manipulates foot control 29, only the handpiece which has been removed from its socket will commence operating.

The operation may be more fully understood by an examination of the diagram of FIGURE 14. Air from any suitable source enters the system through conduit 183, passing through master valve 184 which is electrically controlled in part by console button 24. A conventional pressure regulator 185 adjusts the pressure of the air to approximately 70 pounds per square inch. The regulated air then flows into manifold 186 where its flow is divided. Assuming a dental console which supports only three dental handpieces, lines 187 carry air from the manifold to each of three pilot valves 182. A separate passage 188 extends through conduit 28 (FIGURE 3) to foot control 29. The foot control, as is well known, has separate valves and control pedals or buttons for the flow of drive air, chip air, and water. Drive air and chip air passages 189 and 190 lead directly from the foot control to a series of three selector valves, the air flowing into the valves through passages 159 and 157. A third passage 191 from the foot control leads to combination valve 192 which controls the flow of water to the aligned passages 156 of the selector valves through water inlet conduit 193. An end plate 194 seals off the end of passages 156 and 157 and may, if desired, seal off the end of passage 159. Preferably, however, the circuit includes a bypass passage 195 which carries drive air through an oiler or mist lubricator 196 and a pressure regulator 197 which reduces the pressure to approximately 35 pounds per square inch. The reason for the bypass is that not all of the dental instruments carried by the console head may be designed to operate under the same air pressures or conditions. Most modern turbine-driven ball-bearing handpieces operate effectively with air pressure of approximately 35 pounds per square inch, but such air must carry a lubricant mist to lubricate and cool the bearings. On the other hand, a turbine-driven air-bearing handpiece requires dry unlubricated air at greater pressure.

If, for example, the handpieces in communication with stems 145a and 145b are ball-bearing handpieces, and the handpiece in communication with stem 145c is an air-bearing handpiece, then instead of a sealing ring 160, a plug 198 is located in the passage 159 between the selector valves for the different types of handpieces. Dry air at higher pressures flows directly to the selector valve for the handpiece in communication with 145c, whereas lubricated air under reduced pressure flows to the selector valves for the handpieces in communication with 145a and 145b.

None of the selector valves is operative to direct drive air, chip air, or water to its handpiece unless the pilot valve 182 for the particular selector valve is opened. As previously described, the opening of each pilot valve occurs when the hose-supporting trolley in association with that valve is lifted because of the withdrawal of a dental instrument from the holder or head.

Referring to FIGURE 15, it will be seen that pinion 65 carries a cam 199 which is engageable with the operating lever 200 of a switch 201, during a certain predetermined angular distance of travel of the pinion. Contact between cam 199 and arm 200 is synchronized with retraction and extension of head 16 during that portion of head travel when the trolleys 110 are drawn upwardly by hoses 36 above the level of contact members 177 (FIGURE 5).

Switch 201, when actuated, closes the master valve 184 diagrammatically indicated in FIGURE 14 and, therefore, the flow of air and water to the selector valves is blocked when the head is fully retracted even though pilot valves 182 remain open because the trolley pulleys 128 are raised out of contact with members 177.

While in the foregoing I have disclosed an embodiment of the present invention in considerable detail for purposes of illustration, it will be understood by those skilled in the art that many of these details may be varied without departing from the spirit and scope of the invention.

I claim:
1. In a dental console having means for removably supporting at least one dental instrument having a fluid-carrying hose connected thereto, hose supporting means within said console for supporting and guiding the hose connected to said instrument, said hose supporting means comprising a vertical guide rod and a trolley assembly disposed within said console, said trolley assembly includ- ing a vertically extending pulley carried by a frame, said frame being slidable vertically along said guide rod and being equipped with releasable latching means for holding said assembly against downward movement without restraining upward movement thereof, said releasable latching means comprising a ring carried by said frame and having an opening through which said guide rod extends, said ring when in a substantially horizontal position being freely slidable along said rod and when in an inclined position being engageable with said rod to prevent downward movement of said trolley assembly therealong, and spring means mounted upon said frame for normally urging said ring into its inclined position.

2. The structure of claim 1 in which a control bar is mounted upon said frame for limited upward and downward movement with respect thereto, said bar being operatively connected to said ring for holding the same in a substantially horizontal position when said bar is lowered, and for permitting movement of said ring into its inclined position when said bar is raised, and stop means engageable by said bar for urging the same downwardly when said trolley is fully raised and for urging the same upwardly when said trolley is fully lowered.

3. The structure of claim 2 in which said stop means comprises a pair of stop members mounted upon said guide rod along the upper and lower ends thereof, said members being adjustable into selected positions of adjustment along said rod.

4. The structure of claim 2 in which said rod has an upper portion of substantial vertical extent and a lower portion of lesser vertical extent, said lower portion being of sufficiently smaller diameter than said upper portion so that said locking ring is incapable of engaging and locking said trolley against downward movement when said ring is positioned about said lower portion.

5. The structure of claim 1 in which said guide rod and trolley assembly is removably mounted within said console.

6. The structure of claim 5 in which the upper end of said guide rod is received within a socket provided by a transverse frame member of said console, said rod being movable a limited distance upwardly within said socket, and releasable latching means engaging the lower end of said rod and normally preventing upward movement of said rod within said socket, said rod being movable upwardly and its lower end being movable horizontally to clear said latching means and permit removal of said rod and trolley assembly when said latching means is in a releasing position.

7. The structure of claim 6 in which a plurality of said guide rods and trolley assemblies are removably mounted within said console for supporting and guiding the hoses for a plurality of said dental instruments, said latching means including an elongated horizontal member secured to said console and having upwardly-opening recesses receiving the lower ends of said rods, said rods each having a circumferential groove spaced above the extreme lower end thereof, and a latching plate slidably mounted upon said member and having openings therein above said recesses, said openings having enlarged portions aligned with said recesses when said plate is in a rod-releasing position and reduced portions aligned with said recesses when said plate is in a rod-latching position, said reduced portions being narrower than the diameter of said rods at the extreme lower ends thereof but larger than the diameter of said rods in the area of said grooves, said enlarged portion being larger than the diameter of the extreme lower end portions of said rods, said latching plate being slidable into and out of said grooves of said rods to latch and release the same.

8. The structure of claim 1 in which a plurality of said guide rod and trolley assemblies are provided for supporting and guiding the hoses of a plurality of said dental instruments, a selector valve assembly disposed within said console, each of said hoses extending from an instrument about a trolley assembly and then to said selector valve assembly, and means engageable by said trolley assemblies and being operatively associated with said valve assembly for controlling the operation of said valve assembly when said means is engaged and disengaged by said trolley assemblies, said means comprising a plurality of valve-operating levers engaged by said trolley pulleys when said trolleys are in their lowered positions, said valve assembly including pilot valves operatively associated with each of said levers and communicating with selector valves adapted to control the flow of fluids through said instrument hoses, said pilot valves being closed when the operating levers therefor are engaged by the pulleys of said trolley assemblies.

9. The structure of claim 1 in which a plurality of said guide rod and trolley assemblies are provided for supporting and guiding the hoses of a plurality of said dental instruments, a selector valve assembly disposed within said console, each of said hoses extending from an instrument about a trolley assembly and then to said selector valve assembly, and means engageable by said trolley assemblies and being operatively associated with said valve assembly for controlling the operation of said valve assembly when said means is engaged and disengaged by said trolley assemblies, said valve assembly including a plurality of selector valves for controlling the flow of fluids through each of said hoses, said selector valves being arranged in side-by-side relation and having aligned first passages commonly connected to conduits for supplying air and water to all of said valves, each of said valves having second passages intersecting said first passages and containing valve members movable to open and close the communication between the first and second passages of each valve, and operating members for simultaneously moving all of the valve members of each valve between their open and closed positions, means urging each of said operating members into a position for closing the valve members connected thereto, said means engageable with said trolley assemblies being operatively associated with said selector valves for shifting said operating members to open and close the valve members connected thereto as said trolley assemblies move out of and into engagement with said means.

10. The structure of claim 9 in which said last-mentioned means comprises a plurality of levers engageable by said trolley assemblies, each of said levers being connected to a pilot valve operatively associated with one of said operating members for closing the selector valve therefor when said lever is engaged by a trolley assembly.

References Cited

UNITED STATES PATENTS 3,209,457  10/1965  Billin _____ 32—22
3,280,458  10/1966  Deelely _____ 32—22

FOREIGN PATENTS 1,243,872  9/1960  France.

ROBERT PESHOCK, Primary Examiner